Patented Jan. 10, 1939

2,143,007

UNITED STATES PATENT OFFICE 2,143,007

DEHUMIDIFYING SOLUTION

Sheldon B. Heath and Forest R. Minger, Midland, Mich., assignors to The Dow Chemical Company, Midland, Mich., a corporation of Michigan No Drawing. Application March 2, 1935, Serial No. 9,107

2 Claims. (Cl. 252—2.5)

The invention relates to solutions suitable for dehumidifying air and other like gases and particularly to a solution for use in air conditioning apparatus in which the solution is to be reconcentrated after dilution caused by absorption of moisture during use.

Various hygroscopic solutions have been proposed for use in dehumidifying air. Among the most common are aqueous calcium chloride and sulphuric acid. In ordinary air drying apparatus embodying a reconcentration system, the use of sulphuric acid is impractical from the standpoint of corrosion and inability to remove the sulphur trioxide fog formed during concentration. Aqueous calcium solutions are not entirely satisfactory because many industrial applications of air conditioning require a lower dew point in the treated air than can be obtained with even a saturated calcium chloride solution without cooling the same below atmospheric temperature.

It is therefore an object of this invention to provide a dehumidifying solution which can be reconcentrated without decomposition and which makes possible the drying of air in the low humidity range not covered by calcium chloride solution. A concentrated solution of lithium chloride has a lower aqueous tension than a correspondingly saturated solution of calcium chloride at like temperature, and under the same conditions will therefore produce a lower dew point in air contacted therewith. Even so lithium chloride solutions do not reduce the dew point of air dried therewith sufficiently in many cases.

We have now found that aqueous solutions containing both these salts can be prepared having a much higher solute concentration than a saturated aqueous solution of either salt alone at like temperature. As a result solutions of the mixed salts can be prepared having a considerably lower aqueous tension than can be obtained with solutions of either salt alone at corresponding temperatures. We have found also that the incorporation in the solution containing lithium chloride and calcium chloride of other hygroscopic salts in the amount up to the limit of their solubility therein still further reduces the aqueous tension of the solution. Among the salts which are suitable for such use are calcium bromide and lithium bromide.

The following observations are illustrative of the effect of lithium chloride and calcium chloride on the mutual solubilities of each in water and of the aqueous tension of the solutions thereof compared to that of a solution of either salt alone at corresponding temperatures. For example, at 90° F. 26 grams of lithium chloride dissolves in 31.6 grams of water to form a saturated solution, the aqueous tension of which is about 4.1 millimeters of mercury, and 30 grams of calcium chloride dissolves in 28.8 grams of water to form a saturated solution at the same temperature, the aqueous tension of which is 8 millimeters. Contrasted with these solubilities and aqueous tensions, we find that the aforesaid quantities of salts together dissolve in only 44 grams of water (compared to a total of 60.4 grams when separately dissolved) to form a solution which is saturated with respect to both salts. The aqueous tension of the saturated solution so obtained is about 3.2 millimeters at 90° F., that is, the aqueous tension is 20 per cent lower than that of a saturated solution of lithium chloride and 60 per cent lower than that of a saturated solution of calcium chloride at the same temperature.

At 90° F. the relative proportions of the salts, expressed as the weights of the anhydrous compounds LiCl and $CaCl_2$, which can be dissolved in an aqueous solution to saturate it with respect to both salts is 47 per cent and 53 per cent, respectively. When the proportion of calcium chloride is greater than 53 per cent and that of lithium chloride correspondingly less, solutions can be prepared which are saturated with respect to calcium chloride and unsaturated with respect to lithium chloride. Their aqueous tensions are lower than those of a saturated lithium chloride solution when the proportion of calcium chloride does not exceed about 64 per cent of the combined weight of both anhydrous salts. When the proportion of calcium chloride is less than 53 per cent and greater than 1 per cent of the weight of both salts (while the proportion of LiCl is from 47 to 99 per cent) then solutions can be prepared which are saturated with respect to lithium chloride and unsaturated with respect to calcium chloride and their aqueous tensions are also lower than that of saturated lithium chloride solutions at the same temperature. Thus, mixed solutions of calcium chloride and lithium chloride containing the salts in proportions by weight between $$\frac{1 CaCl_2}{99 LiCl}$$

and $$\frac{64 CaCl_2}{36 LiCl}$$

when saturated at 90° F., all have a lower aqueous tension than a saturated LiCl solution at the same temperature. This range covers solutions which are most advantageous for use in dehumidifying air and other gases. However, the invention is not limited thereto. When a higher temperature than 90° F. is chosen as the criterion for determining the saturation point of the solutions of calcium chloride and lithium chloride, it is found that higher proportions of calcium chloride than those aforementioned may be employed to form mixed solutions having a lower aqueous tension than a saturated lithium chloride solution at the same temperature.

As a further illustration of proportions of the two salts, the solution of which possesses a lower aqueous tension than that of a saturated solution of either salt alone may be had by dissolving the two salts in water at 40° F., for example. A solution of lithium chloride saturated at 40° has an aqueous tension of about 6.1 millimeters at 90° F. and a solution of calcium chloride saturated at 40° F. has an aqueous tension of about 17.3 mm. at 90° F. The two salts together in the proportions of 27.5 per cent of calcium chloride and 72.5 per cent of lithium chloride (expressed on a dry weight basis) form a solution which is saturated with respect to both salts at 40° F., and its aqueous tension is about 5.6 millimeters at 90° F. When the proportion of calcium chloride is greater than 27.5 per cent and that of lithium chloride correspondingly less, the solution may be saturated with respect to calcium chloride and unsaturated with respect to lithium chloride, and with a calcium chloride proportion up to 35 per cent (corresponding to 65 per cent lithium chloride) the solutions have an aqueous tension of less than 6.1 millimeters at 90° F. When the proportion of calcium chloride is less than 27.5 per cent and greater than 1 per cent, solutions may be prepared which are saturated with respect to lithium chloride and unsaturated with respect to calcium chloride, and the aqueous tensions of such solutions measured at 90° F. are also lower than 6.1 millimeters.

Thus, we have found that at any given temperature ordinarily encountered in air dehumidification a range of proportions of calcium chloride to lithium chloride exists over which solutions can be prepared having a lower aqueous tension than a correspondingly saturated aqueous solution of either salt alone at like temperature. Furthermore, for each temperature there is one proportion between the limits of the range thereof in which the solution is saturated with respect to both salts. Such a solution when saturated is termed a congruently saturated solution and possesses the lowest aqueous tension of any that can be prepared from the two salts at corresponding temperatures.

For the preparation of the solutions the anhydrous salt or salts containing water of crystallization may be used and after dissolving in water the solution may be concentrated if necessary or desirable by evaporation to attain the desired degree of water concentration. It is generally preferable to employ the salt mixtures in concentrated aqueous solution.

In the following table are given for illustrative purposes certain compositions of calcium chloride and lithium chloride in aqueous solution saturated at 90° F., together with the aqueous tension of such solutions at 90° F. and the dew point of air in equilibrium with such solutions at the same temperature.

*Table*

| Composition of solution in grams of anhydrous salt per 100 grams of solution saturated at 90° F. | | Aqueous tension at 90° F. in mm. of mercury | Dew point in °F. of air in equilibrium with the solution at 90° F. |
|---|---|---|---|
| CaCl₂ | LiCl | | |
| 51* | None | 8.0 | 40.4 |
| 35* | 19 | 4.08 | 29.1 |
| 30* | 27* | 3.2 | 23.4 |
| 11 | 38* | 3.4 | 24.8 |
| 1 | 45* | 4.05 | 28.9 |
| None | 45* | 4.1 | 29.3 |

* Solution is saturated with respect to the salt at the head of the column.

It will be understood that the foregoing and other compositions hereinbefore given by way of illustration are not to be regarded as limiting the invention, inasmuch as it will be seen by comparing the data given above that suitable proportions vary with the temperature. The most effective proportions, however, are those in which the solutions exhibit a lower aqueous tension than that of a saturated aqueous solution of either salt alone at corresponding temperatures. The aqueous tensions of saturated solutions of the single salts are given in the table for comparison, as well as the dew point of air in equilibrium with the solutions computed from the aqueous tension thereof compared to that of pure water at the same temperature. In addition to possessing a lower aqueous tension than saturated solutions of either salt alone, solutions of the two salts have the advantage that in contrast with ordinary saturated calcium chloride solutions they do not cake solidly upon cooling slightly below the temperature at which the solution is saturated, but rather deposit fine crystals which remain in suspension. This is a distinct advantage since the apparatus does not become clogged should the temperature fall below the saturation point. The solutions also do not hydrolyze to any significant extent; they are odorless and the solute is non-volatile under ordinary conditions of use. Therefore, they may be used for long periods of time in suitable dehumidifying apparatus without damage thereto or contamination of the air or other like gas in contact with the solution.

The hereindescribed mixed solutions of calcium chloride and lithium chloride are advantageous for use in methods for dehumidifying and conditioning air and other gases, in that (1) air or like gas can be dried to a much lower relative humidity than could be obtained heretofore by use of known salt solutions without cooling the same below atmospheric temperatures; (2) our solution can be repeatedly or continuously reconcentrated without decomposition or significant loss of solute; (3) the solutions do not cake solidly upon cooling slightly below the saturation point as do ordinary calcium chloride solutions.

Other modes of applying the principle of our invention may be employed instead of the one explained, change being made as regards the materials employed provided the ingredients stated by any of the following claims or the equivalent of such stated ingredients be employed.

We therefore particularly point out and distinctly claim as our invention:—

1. A composition of matter for removing moisture from gaseous media comprising the following ingredients in aqueous solution in the approximate proportions given, the percentage being by moles:—

|  | Per cent |
|---|---|
| Lithium chloride | 70 |
| Calcium chloride | 30 |

2. A composition of matter for removing moisture from gaseous media comprising calcium chloride and lithium chloride in aqueous solution in the proportions of from 64 to 22 per cent of calcium chloride and from 36 to 78 per cent of lithium chloride based upon the combined weight of the dry salts.

SHELDON B. HEATH.
FOREST R. MINGER.